(12) United States Patent
Modak et al.

(10) Patent No.: US 11,643,340 B2
(45) Date of Patent: May 9, 2023

(54) POTABLE WATER PRODUCING DEVICE

(71) Applicant: Sulis Water International Inc., New Brunswick, NJ (US)

(72) Inventors: Anurag Modak, East Wndsor, NJ (US); Yuki Tong Chul Osumi, Lodi, NJ (US); Sarah Flora Pomeranz, Brookline, MA (US); Arye Shmuel Mendelow, Chicago, IL (US)

(73) Assignee: Sulis Water International Inc., New Brunswick, NJ (US)

( * ) Notice: Subject to any disclaimer, the term of this patent is extended or adjusted under 35 U.S.C. 154(b) by 595 days.

(21) Appl. No.: 16/505,456

(22) Filed: Jul. 8, 2019

(65) Prior Publication Data
US 2020/0079662 A1    Mar. 12, 2020

Related U.S. Application Data

(60) Provisional application No. 62/695,639, filed on Jul. 9, 2018.

(51) Int. Cl.
*C02F 1/28* (2006.01)
*C02F 1/00* (2006.01)
(Continued)

(52) U.S. Cl.
CPC .............. *C02F 1/281* (2013.01); *C02F 1/002* (2013.01); *C02F 1/32* (2013.01); *C02F 9/005* (2013.01);
(Continued)

(58) Field of Classification Search
None
See application file for complete search history.

(56) References Cited

U.S. PATENT DOCUMENTS

| | | | | |
|---|---|---|---|---|
| 5,670,247 | A | * 9/1997 | Takaoka | C02F 1/725 428/326 |
| 6,409,928 | B1 | * 6/2002 | Gonzalez | B01D 53/864 210/748.14 |

(Continued)

FOREIGN PATENT DOCUMENTS

| | | | | |
|---|---|---|---|---|
| CN | 202482101 U | * 10/2012 | | C02F 1/32 |
| CN | 202482101 U | 10/2012 | | |

(Continued)

OTHER PUBLICATIONS

Written Opinion of the International Searching Authority, dated Jan. 22, 2020, for corresponding PCT Application No. PCT/US19/40991, filed on Jul. 9, 2019, consisting of 6 pages.

(Continued)

*Primary Examiner* — Jonathan M Peo
(74) *Attorney, Agent, or Firm* — David Postolski; Gearhart Law LLC

(57) ABSTRACT

A water treatment device comprising a clear container with lid surrounded by a solar reflector, and an insert in the form of a thin sheet or mesh permanently coated with titanium dioxide as a water sanitizing catalyst. The container is filled with non-potable water, covered with the lid, and placed in direct sunlight. Direct and reflected sunlight enters the water through the clear container and lid, where the sunlight's ultraviolet (UV) radiation and increased solar thermal heat disinfect the water. Further, the catalyst on the insert reacts with dissolved oxygen in the water to produce reactive oxygen species. These reactive species react with and decompose organic compounds in the water, and kill or inactivate pathogens. In addition, the reactive oxygen species further react with the water itself to produce additional free radical species, which also react with and decompose organic compounds and kill or inactivate pathogens.

12 Claims, 13 Drawing Sheets

(51) Int. Cl.
*C02F 9/00* (2006.01)
*C02F 1/32* (2006.01)

(52) U.S. Cl.
CPC ...... *C02F 2303/04* (2013.01); *C02F 2305/10* (2013.01)

(56) References Cited

U.S. PATENT DOCUMENTS

| | | | | |
|---|---|---|---|---|
| 9,097,437 | B2* | 8/2015 | Hilliard | F24S 23/74 |
| 9,809,468 | B1* | 11/2017 | Jain | C02F 1/725 |
| 2013/0118995 | A1* | 5/2013 | Hawkins, II | C02F 1/325 |
| | | | | 422/186 |
| 2013/0153515 | A1* | 6/2013 | Kang | C02F 1/32 |
| | | | | 210/201 |
| 2014/0183141 | A1* | 7/2014 | Kurup | B01J 35/002 |
| | | | | 210/748.09 |
| 2014/0238837 | A1* | 8/2014 | Jan | C02F 1/14 |
| | | | | 202/185.1 |
| 2017/0233269 | A1* | 8/2017 | Mohanty | C02F 1/4672 |
| | | | | 204/275.1 |

FOREIGN PATENT DOCUMENTS

| | | | | |
|---|---|---|---|---|
| JP | 2004195461 A | * | 7/2004 | B01J 35/02 |
| JP | 2004195461 A | | 7/2004 | |
| WO | 2020014218 A2 | | 1/2020 | |
| WO | WO-2020014218 A2 | * | 1/2020 | C02F 1/28 |
| WO | WO-2020014218 A3 | * | 1/2020 | C02F 1/28 |

OTHER PUBLICATIONS

International Search Report, dated Jan. 22, 2020, for corresponding PCT Application No. PCT/US19/40991, filed on Jul. 9, 2019, consisting of 2 pages.

* cited by examiner

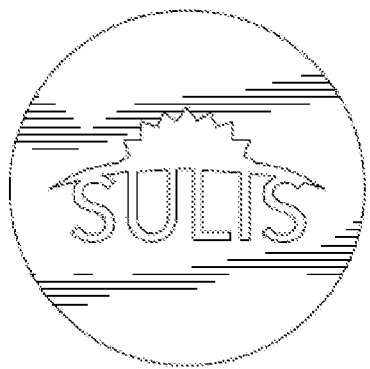
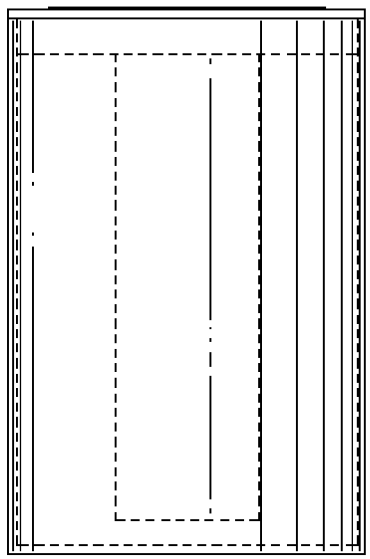
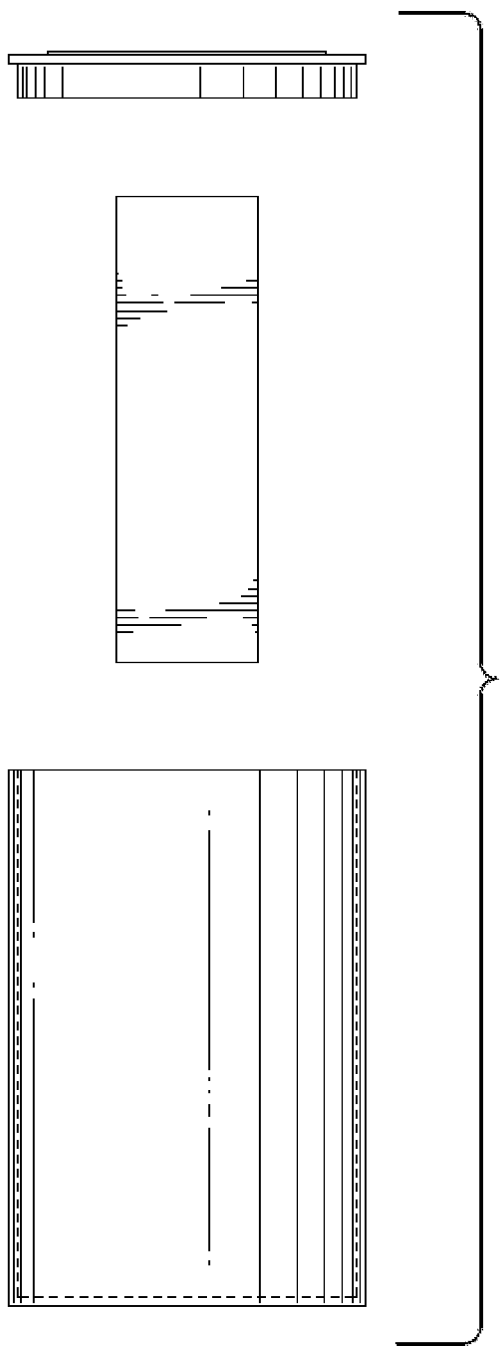
FIG. 2A  FIG. 2B

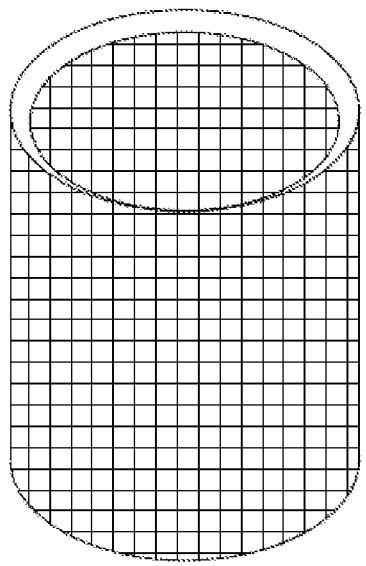
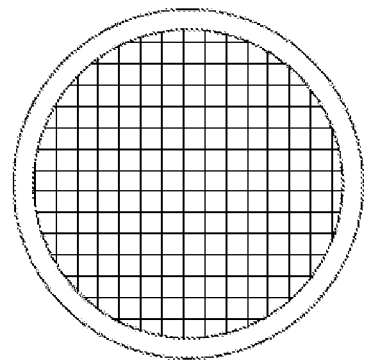
FIG. 6E  FIG. 6F
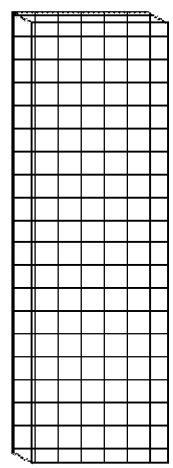
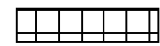
FIG. 6G  FIG. 6H

POTABLE WATER PRODUCING DEVICE

RELATED APPLICATIONS

This application claims priority under 35 U.S.C. § 119 to United States provisional application No. 62/695,639 filed on Jul. 9, 2018 in the United States Patent and Trademark Office, the entire disclosure of which is incorporated herein by reference.

FIELD OF THE INVENTION

The invention relates to water sanitation, producing potable water from non-potable water.

BACKGROUND

Water purification technologies and methodologies are known, but they are largely inappropriate for use in certain situations. Typically, they require expensive metals and materials, or electricity to help power ultraviolet light lamps in order to function. However, these devices are both expensive to make and require existing infrastructure, such as an electrical grid and a municipal water supply. These may be unavailable in rural areas of countries with underdeveloped economies, or in damaged infrastructure in regions affected by natural disasters. As a result, water-borne diseases are a major threat to affected populations, particularly those in poverty. If water is available but unhealthful to drink, and rendering it potable is too expensive or difficult to achieve, then a sustainable and affordable solution may not be possible. A potable water solution is needed that is both cheap enough for those in poverty to afford, and effective enough to providing potable water to entire communities without the need for infrastructure.

The so-called solar disinfection (SODIS) method may be appropriate for use by individuals in such conditions, but SODIS has limitations that make it ineffective for use on a scale suitable to supply entire communities. SODIS sanitizes water effectively only if it is minimally turbid. Turbidity is a measure of clarity in water that scatters light, such as due to suspended particles. High turbidity substantially reduces light penetration in water and therefore reduces the disinfection efficiency of the SODIS treatment process. To ensure safe water disinfection, raw water should have turbidity less than 30 Nephelometric Turbidity Units (NTUs). In addition, UV-radiation is reduced by increasing water depth. At a water depth of 10 cm and moderate turbidity level of 26 NTU, sanitizing UV-A radiation is reduced by 50%, so a clear container of raw water must be left in continuous sunlight for at least twelve hours for SODIS to be effective. Therefore, containers used for SODIS should be as flat as possible, preferably having a water depth no more than 10 cm. Accordingly, SODIS systems are generally sized for use by individuals, but are not appropriate for use by entire communities.

Chemical treatments are also commonly used to purify water, but these are inappropriate where the chemicals are unavailable, expensive, or toxic if used improperly. For example, flocculation is possible only when flocculant is available. And, some chlorine-based treatments may react with industrial pollutants in groundwater to produce other, carcinogenic chemicals, thereby transforming one dangerous contaminant into another.

Reverse osmosis mitigates some of these shortcomings, but it creates a large amount of wastewater, about 3-4 times the amount of potable water produced. Thus, it is not appropriate in areas where water is scarce. Moreover, the wastewater contains higher concentrations of pollutants than the original water such as dissolved salts, organic matter, and toxic metals. Reverse osmosis systems also demineralize water. Drinking water with a low mineral content can increase diuresis, which in turn increases the elimination of some essential elements in the body. Demineralized water can also be somewhat acidic, and can cause acidosis, which can cause degenerative diseases.

Thus, the systems and methods of the prior art to produce potable drinking water have significant disadvantages for large-scale use.

SUMMARY

A water treatment device comprising a clear container with lid surrounded by a solar reflector, and an insert in the form of a thin sheet or mesh permanently coated with titanium dioxide as a catalyst. The container is filled with non-potable water, closed with the lid, and placed in direct sunlight. Direct and reflected solar radiation enters the clear container, where the sunlight's ultraviolet (UV) radiation and increased solar thermal temperature disinfect the water. Further, the catalyst on the insert reacts with dissolved oxygen in the water to produce reactive oxygen species. These reactive species react with and decompose organic compounds in the water, and kill or inactivate pathogens. In addition, the reactive oxygen species further react with the water itself to produce additional free radical species, which also react with and decompose organic compounds and kill or inactivate pathogens.

It is to be understood that both the foregoing general description and the following detailed description and drawings are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate disclosed embodiments and aspects and, together with the description, serve to explain the principles of the invention, the scope of which is determined by the claims.

In the drawings:

FIGS. 2A and 2B show side views of the exemplary water sanitizing device embodiment of FIGS. 1A and 1B, respectively, viewed from the front.

FIGS. 6A through 6H show perspective and top views of various exemplary catalytic inserts.

DETAILED DESCRIPTION

Figure 1A:
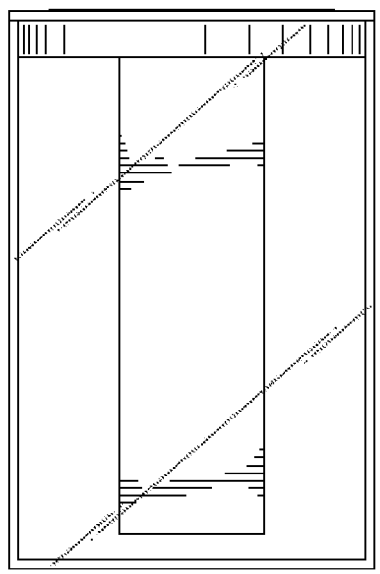
FIGS. 1A and 1B show wireframe side views of an exemplary water sanitizing device embodiment in assembled and expanded views, respectively, in accordance with the disclosure.

The figures and descriptions provided herein may have been simplified to illustrate embodiments and aspects that are relevant for a clear understanding of the herein described processes, machines, manufactures, and/or compositions of matter, while eliminating for the purpose of clarity, other aspects that may be found in prior art devices, systems, and methods. Those of ordinary skill in the pertinent art may recognize that other elements may be used, or may be required to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include such elements, variations, and modifications to the described embodiments and aspects that would be known to those of ordinary skill in the pertinent art.

It is noted that the components of the present invention, as generally described and illustrated in the figures herein, may be configured and arranged in a variety of embodiments that are different from those described herein, without departing from the scope of the appended claims. Accordingly, the following detailed descriptions and illustrations of embodiments and aspects are not intended to limit the scope of the invention as claimed, but are merely representative of selected illustrative embodiments. The usage of the phrases "embodiments", "example embodiments", "some embodiments", or other similar language refers to the fact that a particular feature, structure, or characteristic described may be included in at least one embodiment of the present invention, and do not necessarily all refer to the same embodiment or group of embodiments. Thus, the described features, structures, or characteristics may be combined in any suitable manner in one or more embodiments.

A variety of illustrative embodiments will now be described. These are provided as teaching examples and should not be interpreted to limit the scope of the invention. Although specific details and aspects of the embodiments are presented, the embodiments may be modified by changing, supplementing, or eliminating many of these details.

In embodiments, the device comprises a clear polyethylene terephthalate (PET) container with a PET lid, and a titanium dioxide-coated catalytic insert. The PET container may be in the form of a contiguous body wall with a solid base defining an enclosed space, and open top. In a currently preferred embodiment, the container may be in the form of a hollow right circular cylinder with a solid bottom and open top, although other shapes may be used. The PET lid may be in the shape of a similarly shaped but much shorter contiguous body wall with a solid top and an open bottom. In a currently preferred embodiment, the lid may be in the form of a short hollow right circular cylinder with a solid top and an open bottom, although other shapes may be used. The open bottom of the lid fits snugly over the open top of the container. The open bottom of the lid may have an edge that matches the edge of the open top of the container. A photocatalyst insert is placed into the space enclosed by the container. In a currently preferred embodiment, the catalytic insert may comprise at least one thin metal sheet or mesh coated with a layer of titanium dioxide. In embodiments, a solar reflector may be used to reflect sunshine into the container.

In use, the container is filled with unpotable water, the catalytic insert is placed in the container, the container is covered with the lid and is placed in direct sunlight for an amount of time sufficient to sanitize the water to a potable condition. There are many ways to configure the container, lid, and catalytic insert to provide for such use. For example, the insert may be in the form of a free standing structure sized to fit in the container, to be placed into the container. Or, the insert may be permanently attached to an inside surface of the container, such as the bottom, the side wall, or both. Or, the insert may be permanently attached to an inside surface of the lid, such as the top. In a currently preferred embodiment, the top of the lid may include a thin slit configured to match an edge of the insert if made from a thin material such as a sheet or mesh, or a hole configured to match the shape of a solid insert, into which the insert may be slid.

In embodiments, the catalytic insert may be in the form of a solid prism having a base that is a triangle, quadrilateral such as a square or rectangle, or other shape. In other embodiments, the insert may be in the form of a thin sheet or mesh. The sheet or mesh may be flat, or may be configured to present a greater surface area to the water in the container, such as a thin walled spiral, or a plurality of thin fins coupled around a central vertical axis, or the like. In embodiments that do not have a lid with slits into which the insert may slide, concentric thin-walled shapes may be used, such as nested cylinders, nested hollow prisms, or the like.

In embodiments, the container may be placed in the reflected light of a solar reflector. Such a reflector may be in the form of a flat or concave sheet that reflects sunlight through the clear sides of the container. Or, the reflector may be in the form of a hollow frustum, that is, the portion of a three dimensional shape that lies between two parallel planes passing through it. The frustum has an inside surface reflecting light toward a central axis. In a currently preferred embodiment, the frustum may be a truncation of a right cone, or a right pyramid having a triangular, square, or other regular polygonal shape, or a circular paraboloid, with a reflective inside surface. The solar reflector may be made of a solid reflective material, or it may be made as a plastic base with a thin reflective coating on the interior surface.

In its simplest form, the invention is intended for use outdoors where ultraviolet radiation from sunlight can directly sanitize water and also initiate photocatalytic reactions. Embodiments may also include a strainer or other filter fitted to the top of the container through which water is passed to remove mud, leaves, and other large particulates as the water is poured into the container.

In embodiments for indoor use, a small solar panel may be provided to power an LED light to provide an ultraviolet photocatalytic light source. In embodiments, the container may be attached to a water tap to provide a constant flow of water through the container. Such embodiments may comprise a solar panel, battery, direct connection to electrical outlet, and/or other source of electricity to power an internal LED to initiate the photocatalytic reaction.

In general, embodiments are effective to decompose organic compounds and kill or inactivate bacteria and viruses present in the water. Because pathogen particles are killed, they cannot divide and propagate. However, the pathogens may maintain enough of their integrity to be recognized by the immune system and evoke an adaptive immune response. Accordingly, drinking water treated by the disclosed embodiments for a limited duration, or even a single instance of ingestion, may have an immunizing effect that may provide some degree of protection against infectious diseases caused by drinking untreated water. Unfortunately however, the embodiments do not mitigate the presence of harmful inorganic compounds.

The disclosed embodiments sanitize the water in the container using photocatalysis, that is, the acceleration of photoreactions in the presence of a catalyst. The photocatalytic activity generates free radicals (e.g. hydroxyl radicals) that can undergo further reactions, including decomposing organic compounds and inactivating pathogens. In the disclosed embodiments, titanium dioxide ($TiO_2$) is the catalyst, although other catalysts may additionally or alternative be used. Thus, the disclosed embodiments reduce the concentration of organic compounds and the population of bacterial, viral, and other microbial species to achieve predetermined concentrations deemed safe for human consumption.

In embodiments, the photocatalyst is created using a titanium dioxide-based coating sintered onto a metal substrate such as aluminum or steel. Alternatively, directly anodized titanium may be used to generate a photoactive coating.

Figure 1B:
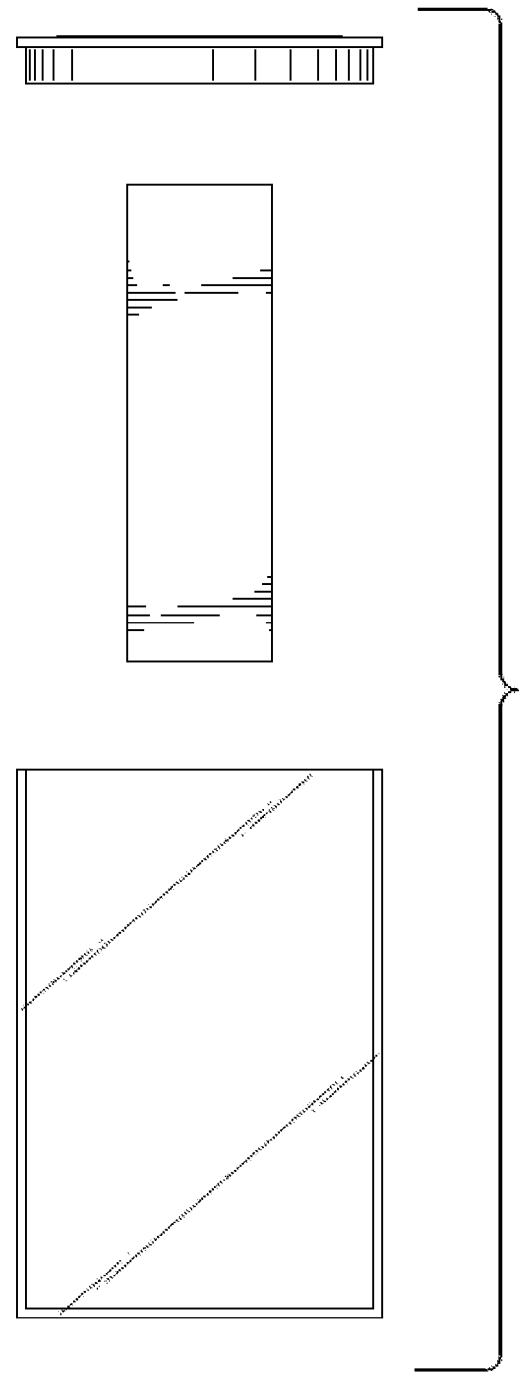

Turning now to the figures, FIGS. 1A and 1B show wireframe side views of an exemplary water sanitizing device embodiment in assembled and expanded views, respectively, in accordance with the disclosure. As shown, the catalytic insert is coupled to the lid and placed into the container filled with unpotable water.

Figure 3A:
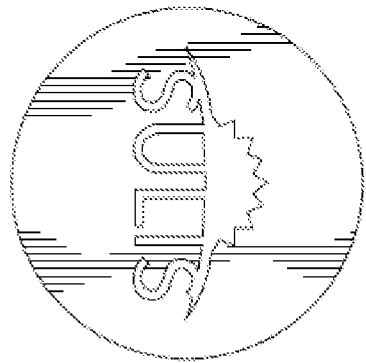
FIGS. 3A and 3B show side views of the exemplary water sanitizing device embodiment of FIGS. 2A and 2B, respectively, viewed from the side.

FIGS. 2A and 2B show side views of the exemplary water sanitizing device embodiment of FIGS. 1A and 1B, respectively, viewed from the front, and also showing a top view of the lid. FIGS. 3A and 3B show side views of the exemplary water sanitizing device embodiment shown FIGS. 2A and 2B, respectively, turned 90° clockwise from the position shown in FIGS. 2A and 2B, viewed from the side.

Figure 3A:
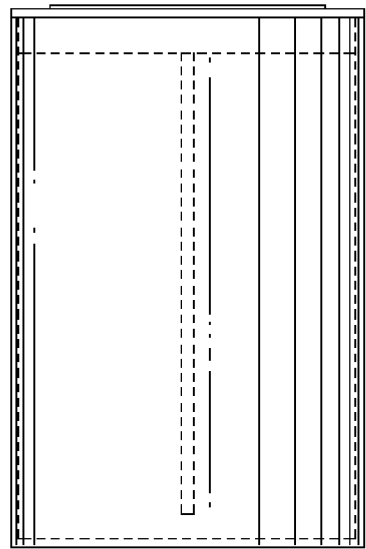
Figure 3B:
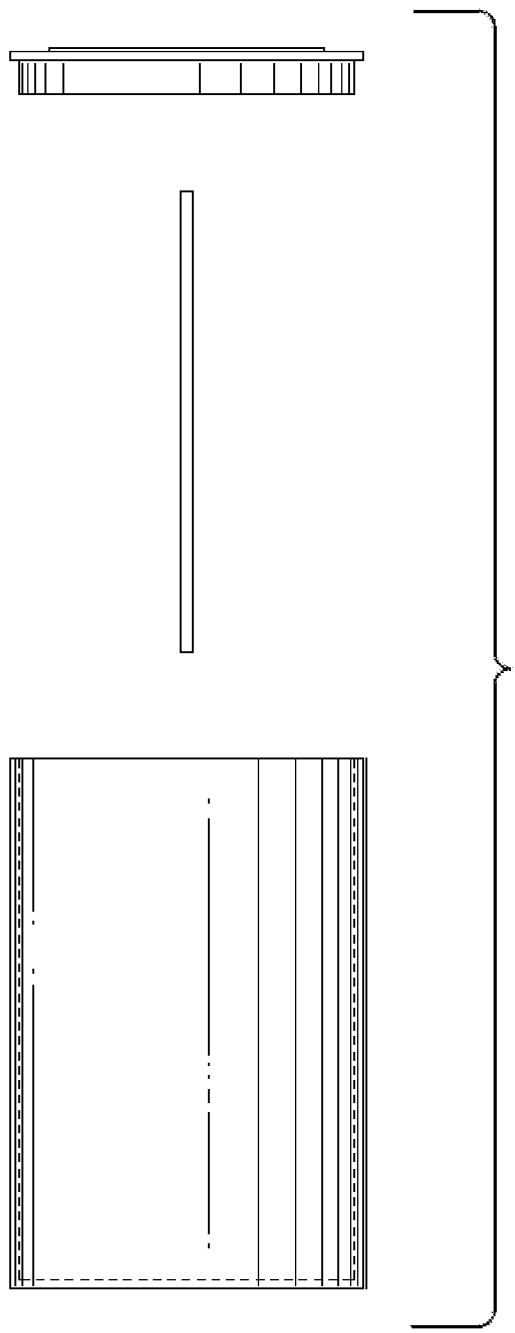
Figure 4A:
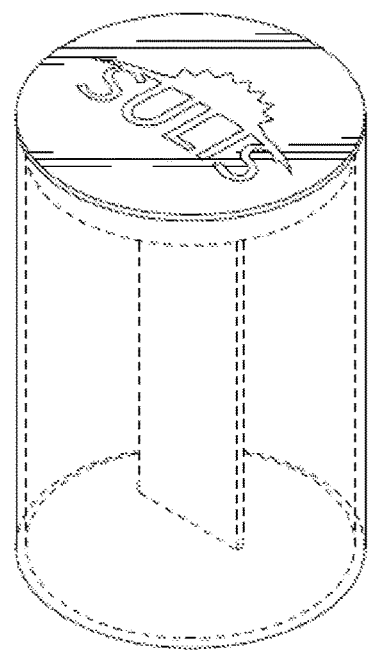
FIGS. 4A and 4B show perspective views of the exemplary water sanitizing device embodiment of FIGS. 2A and 2B, with the lid on and off of the container respectively.
Figure 4B:
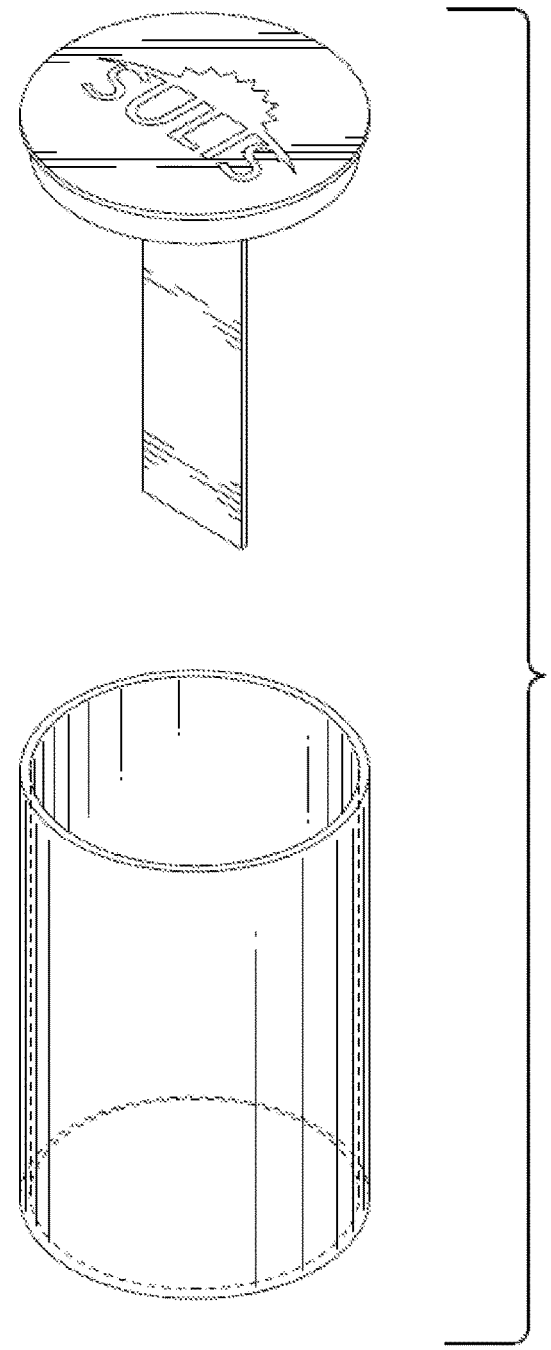

FIGS. 4A and 4B show perspective views of the exemplary water sanitizing device embodiment of FIGS. 2 and 3, with the lid on and off of the container, respectively. As shown in FIG. 4B, the catalytic insert is attached to the lid before the lid is placed on the container.

Figure 5:
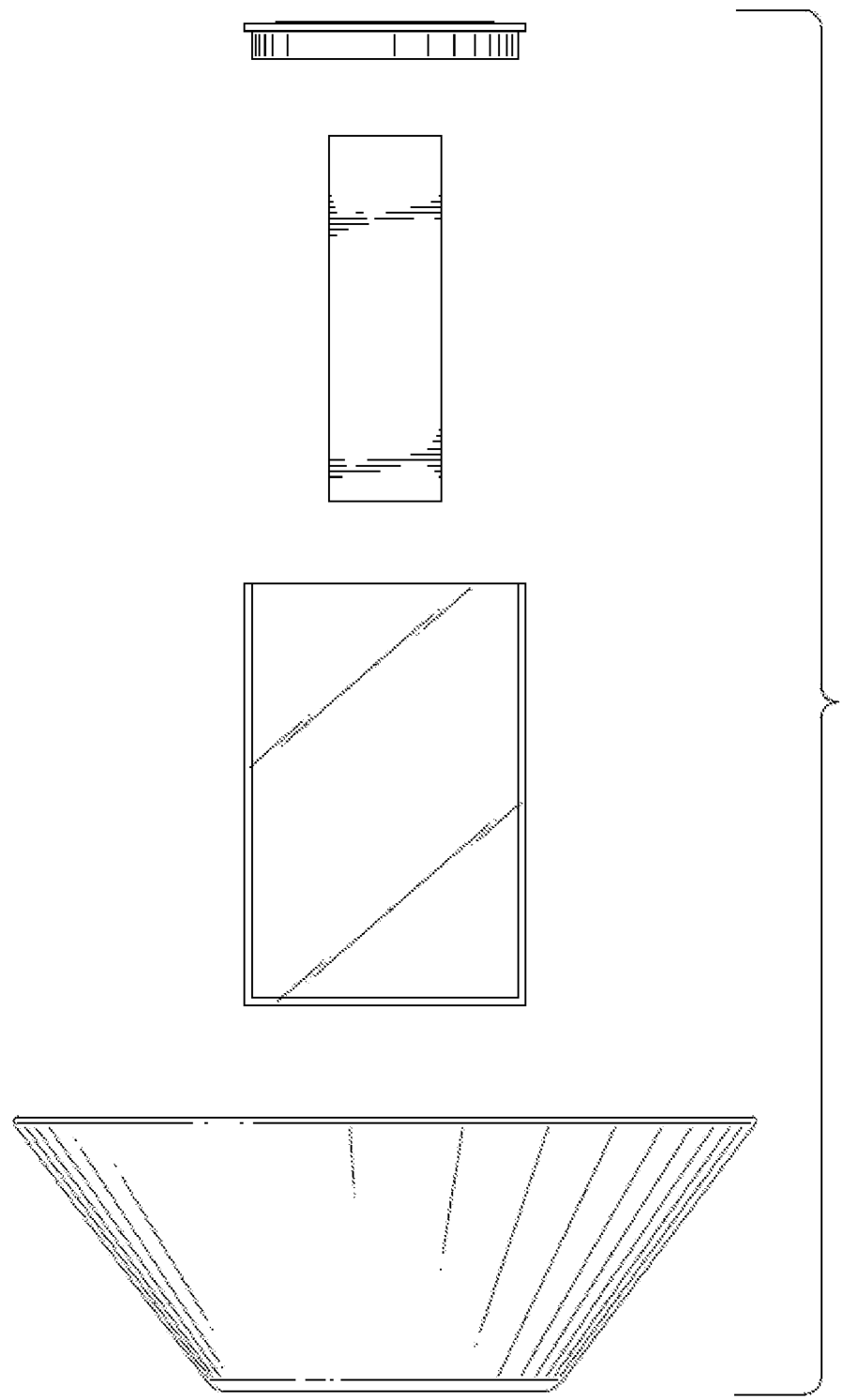
FIG. 5 shows an expanded side view of the exemplary water sanitizing device embodiment of FIG. 1B with a solar reflector.

FIG. 5 shows an expanded side view of the exemplary water sanitizing device embodiment of FIG. 1B with the addition of a solar reflector in which the filled and assembled container may be placed.

Figure 6A:
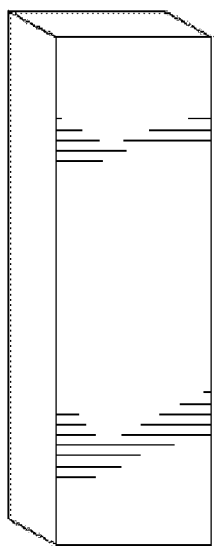
Figure 6B:
Figure 6C:
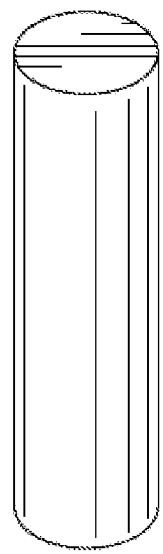
Figure 6D:
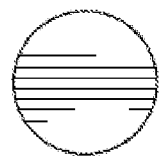

FIGS. 6A through 6H show perspective and top views of various exemplary catalytic inserts, all covered with a layer of $TiO_2$. FIGS. 6A and 6B show perspective and top views, respectively, of a catalytic insert in the form of a solid rectangular prism. FIGS. 6C and 6D show perspective and top views, respectively, of a catalytic insert in the form of a solid circular cylinder. FIGS. 6E and 6F show perspective and top views, respectively, of a catalytic insert in the form of a hollow circular cylinder made of a mesh. And, FIGS. 6G and 6H show perspective and top views, respectively, of a catalytic insert in the form of a hollow rectangular prism made of a mesh.

Figure 7A:
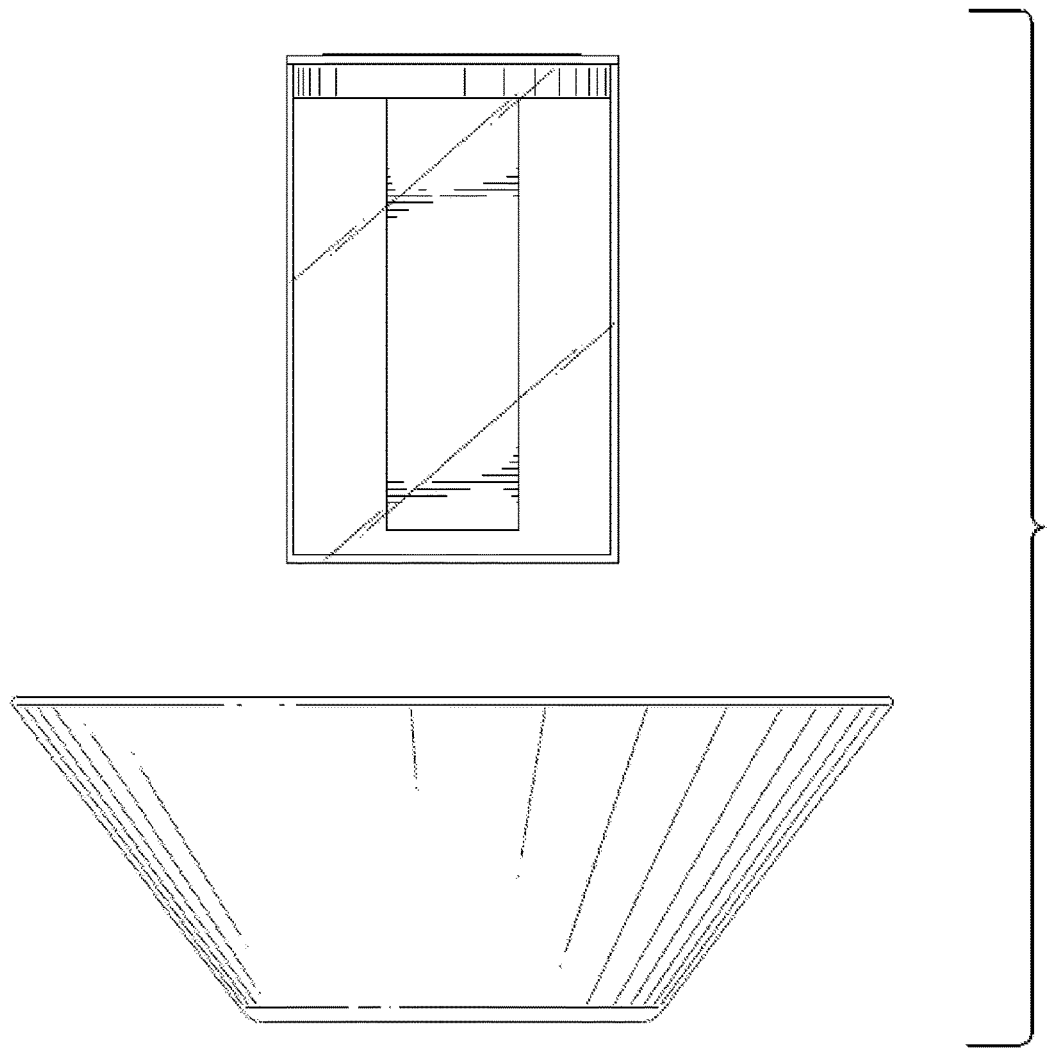
FIGS. 7A through 7C show a container embodiment shown with various catalytic inserts ready to be placed in a solar reflector.
Figure 7B:
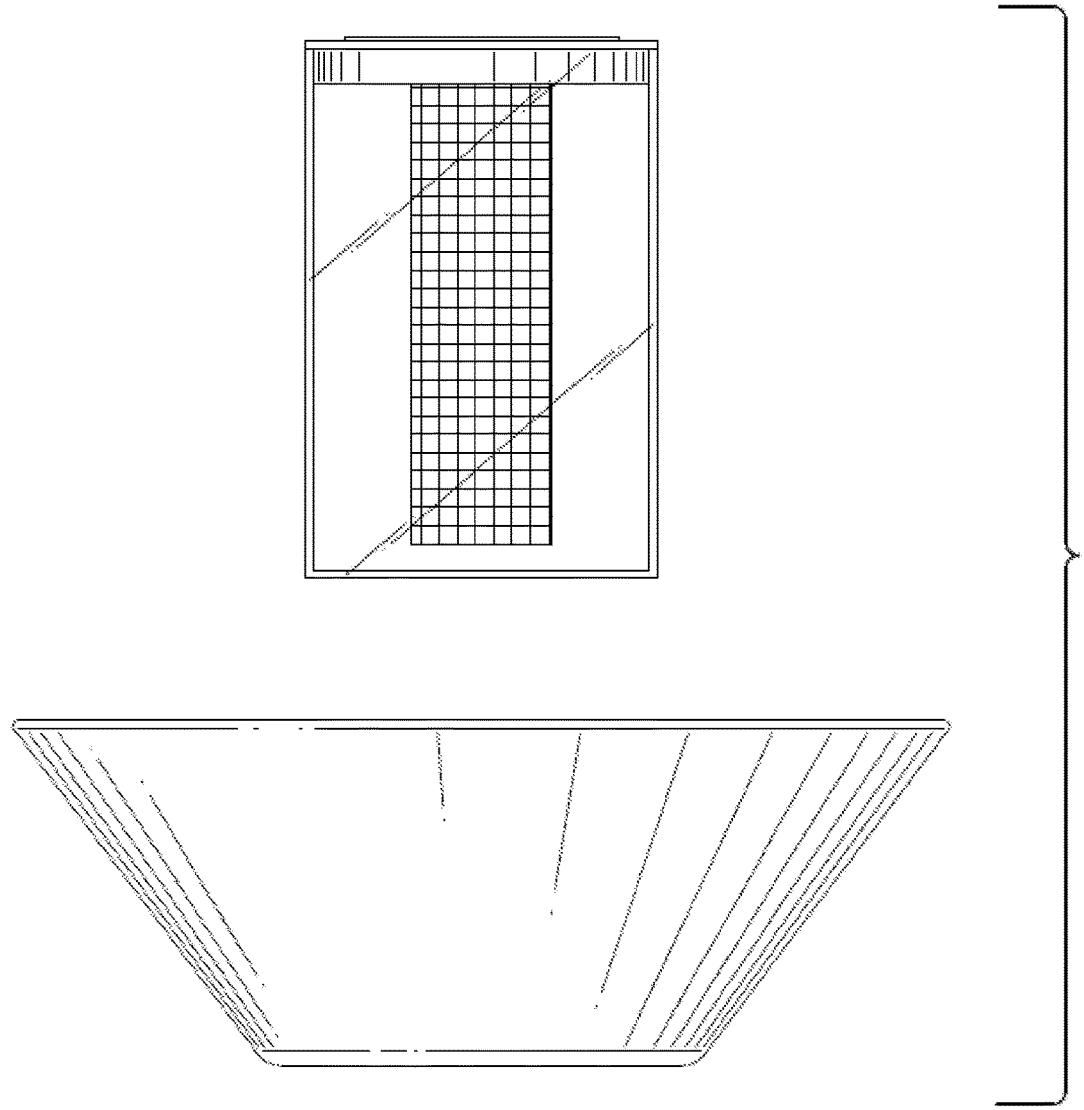
Figure 7C:
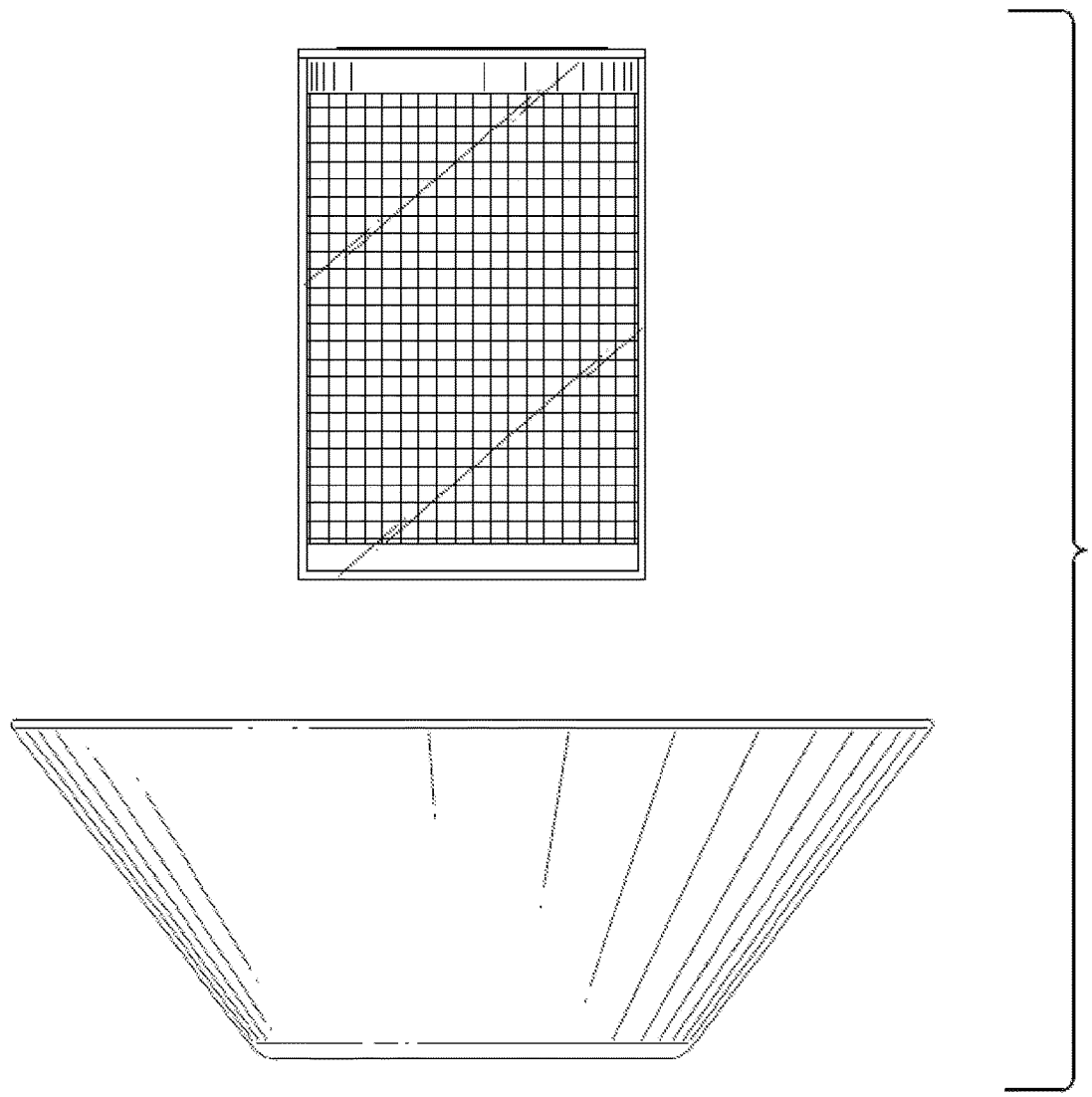

FIGS. 7A through 7C show a container embodiment with lid on enclosing various catalytic inserts ready to be placed in a solar reflector. The catalytic inserts are in the form of a thin solid sheet, a thin mesh of medium width, and a thin mesh fitting snugly inside the container, respectively.

Figure 8A:
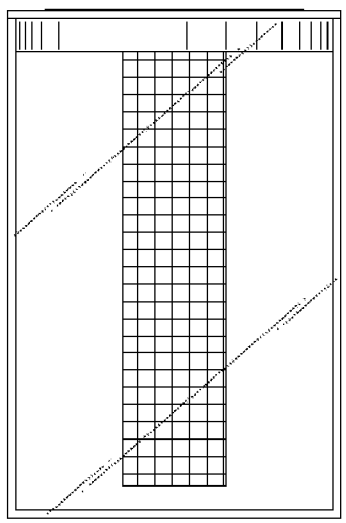
FIGS. 8A and 8B show an exemplary container covered with lid containing mesh and solid catalytic inserts, respectively.
Figure 8B:
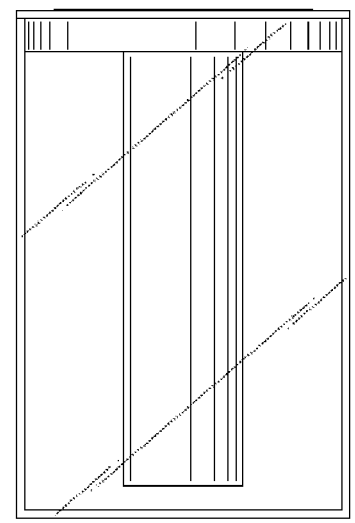

FIGS. 8A and 8B show an exemplary container covered with lid containing mesh and solid catalytic inserts, respectively.

Figure 9A:
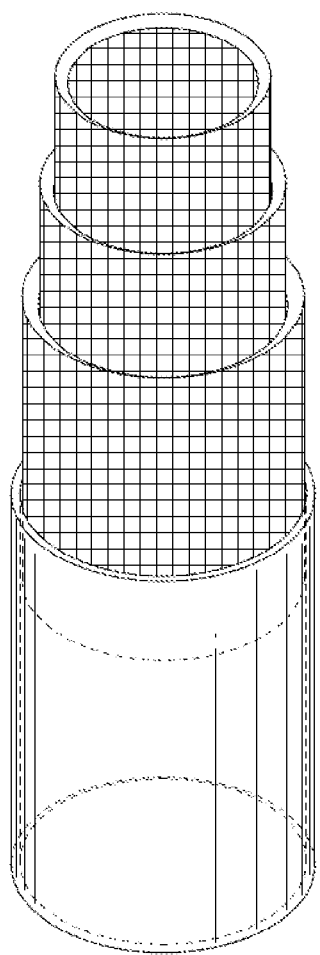
FIGS. 9A and 9B show perspective and top views of an exemplary container with a plurality of nested right circular cylindrical mesh catalytic inserts.
Figure 9B:
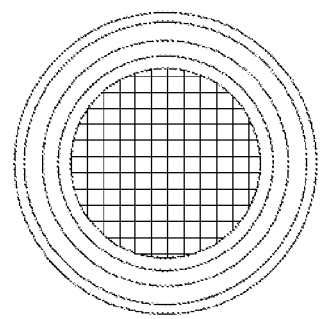

FIGS. 9A and 9B show perspective and top views of an exemplary container with a plurality of nested right circular cylindrical mesh catalytic inserts being assembled.

Figure 10A:
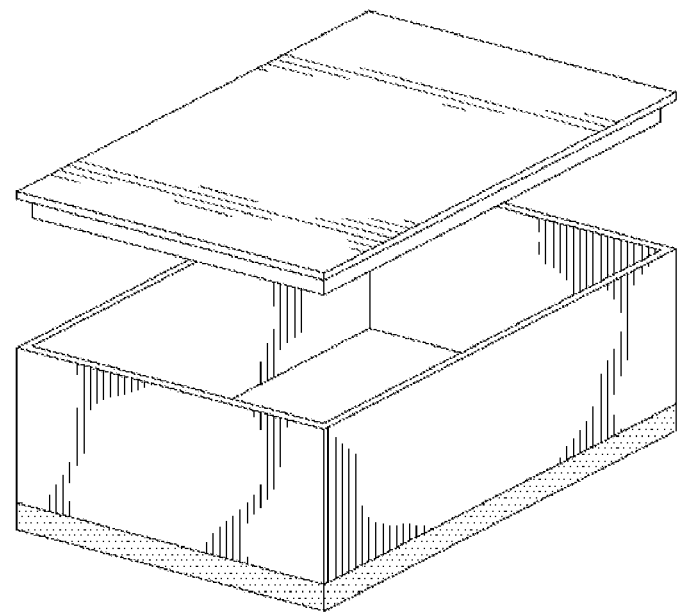
FIGS. 10A and 10B show an embodiment in the shape of a box, and a trap that may be coupled thereto, in accordance with the disclosure.
Figure 10B:
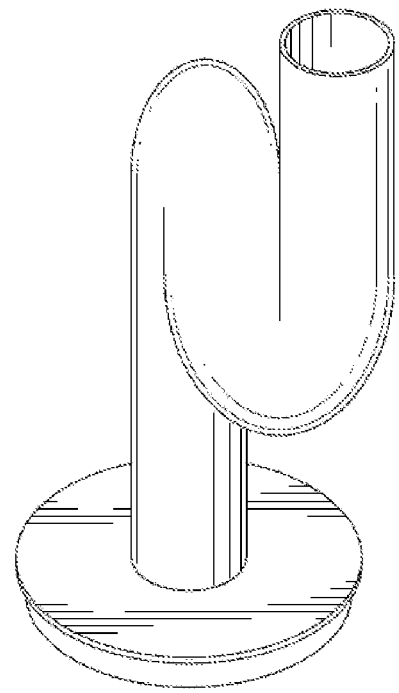

FIGS. 10A and 10B show an embodiment in the shape of a box, and a trap that may be coupled thereto, respectively, in accordance with the disclosure. In this embodiment, the catalytic insert is a flat plate that forms the bottom of the box, covered on the side facing the interior of the box with $TiO_2$. FIG. 10B is a trap that may be attached to the box of FIG. 10A via a hole in the lid (not shown) to catch large particles that may be in the water as the box is filled. The water source may be a tap (not shown) for example, attached to the open end of the trap. This embodiment would be appropriate, for example, for use with a water catchment system that collects rainwater.

The foregoing embodiments may be enhanced in various ways to accommodate use cases beyond those found in undeveloped rural areas, or in regions with damaged infrastructure caused by natural disasters. Illustratively, these use cases can include the following.

Boats: Many boats have an internal water tank. A photocatalytic water sanitization system embodiment can be used to keep the water in the tank sanitized for long periods of time and help prevent the growth of pathogens in the water.

Aquaponics/hydroponics: A photocatalytic water sanitization system embodiment can help keep pathogens in the circulating water free of microbial species without altering the concentration of inorganic compounds, such as salts, nitrates, phosphates, ammonia, and the like.

Military: A water sanitization system may be reduced in size and adapted into a portable form for use by military personnel.

Agriculture: Water may be sanitized using a photocatalytic system for use in large-scale farming operations. Embodiments of the disclosed photocatalytic water sanitization system may be adapted to process larger volumes of water, for example via mechanization, to generate water with reduced microbial species without altering the inorganic compounds present.

Although the invention has been described and illustrated in exemplary forms with a certain degree of particularity, it is noted that the description and illustrations have been made by way of example only. Numerous changes in the details of construction, combination, and arrangement of parts and steps may be made without deviating from the scope of the invention. Accordingly, such changes are understood to be inherent in the disclosure. The invention is not limited except by the appended claims and the elements explicitly recited therein. The scope of the claims should be construed as broadly as the prior art will permit. It should also be noted that all elements of all of the claims may be combined with each other in any possible combination, even if the combinations have not been expressly claimed.

What is claimed is:

1. A water sanitization system suited for use in producing potable water from non-potable water, the water sanitization system consisting of:

a transparent water tank comprising a transparent removable lid and surrounded by a solar reflector, the transparent removable lid comprising a hole, wherein the solar reflector forms a hollow frustum having a hollow paraboloid cone shape, the hollow frustum having an inside frustum surface adapted for reflecting light toward the transparent water tank and toward a central vertical axis;

a water catchment system adapted to collect rainwater, the transparent water tank adapted for use with the water catchment system, and the water catchment system adapted for use as a water source attached to an open end of a trap attached to the hole in the transparent removable lid, in which the water source, being attached to the trap that is attached to the hole in the transparent removable lid, is adapted to fill the transparent water tank with the non-potable water comprising the rainwater filling the transparent water tank; and an insert comprising a photocatalyzing surface on a metal substrate comprising aluminum or steel, the photocatalyzing surface comprising a coating of a water sanitizing catalyst, wherein the water sanitizing catalyst comprises titanium dioxide, wherein the insert comprises a form comprising a solid, a sheet or a mesh, said form having a shape that is a prism or a cylinder, wherein the insert further comprises a plurality of nested concentric shapes of the shape nested around the central vertical axis, wherein the insert is adapted to be permanently affixed to an inside tank surface of the transparent water tank, and wherein when the transparent water tank contains the non-potable water and is then placed in the light for a sufficient amount of time to sanitize the non-potable water by the photocatalyzing surface reacting with dissolved oxygen in the non-potable water to produce reactive oxygen species, the reactive oxygen species then react with and decompose organic compounds in the non-potable water and kill or inactivate pathogens to sanitize the non-potable water to produce the potable water.

2. The system of claim 1, wherein the photocatalyzing surface comprises at least one water-permeable surface.

3. The system of claim 2, wherein the at least one water-permeable surface covers the insert where the insert has the mesh as the form.

4. The system of claim 3, wherein the nested concentric shapes have the shape of the cylinder in a further form of a right circular cylinder.

5. The system of claim 1, wherein the photocatalyzing surface comprises at least one solid impermeable surface.

6. The system of claim 5, wherein the at least one solid impermeable surface is covers the insert where the insert has the sheet as the form.

7. The system of claim 1, wherein the transparent water tank is made of polyethylene terephthalate (PET).

8. The system of claim 1, wherein the transparent removable lid is made of polyethylene terephthalate (PET).

9. The system of claim 1, wherein the solar reflector is made of a solid reflective material or of a plastic base covered with a reflective coating on the inside frustum surface.

10. The system of claim 1, wherein the transparent water tank comprises a hollow circular cylinder with a solid bottom and an open top.

11. The system of claim 1, wherein the insert has the solid as the form that has the shape of the prism having a base.

12. The system of claim 11, wherein the base is selected from the group consisting of: a triangular base and a quadrilateral base.

* * * * *